United States Patent [19]

Bartholomew

[11] Patent Number: 5,538,316
[45] Date of Patent: Jul. 23, 1996

[54] AIR MOVEMENT PROFILER

[75] Inventor: Donald D. Bartholomew, Mt. Clemens, Mich.

[73] Assignee: Proprietary Technology, Inc., Bloomfield Hills, Mich.

[21] Appl. No.: 341,606

[22] PCT Filed: May 18, 1992

[86] PCT No.: PCT/US92/04150

§ 371 Date: Nov. 16, 1994

§ 102(e) Date: Nov. 16, 1994

[87] PCT Pub. No.: WO93/23280

PCT Pub. Date: Nov. 25, 1993

[51] Int. Cl.⁶ .................................................. B62D 35/00
[52] U.S. Cl. ...................... 296/180.5; 296/180.3
[58] Field of Search .................... 296/180.1–180.5; 180/903

[56] References Cited

U.S. PATENT DOCUMENTS

| | | | |
|---|---|---|---|
| 2,685,470 | 8/1954 | Werner | 296/180.1 X |
| 3,326,318 | 6/1967 | De Bevoise . | |
| 3,695,673 | 10/1972 | Meadows . | |
| 3,794,372 | 2/1974 | Webb . | |
| 3,894,764 | 7/1975 | Powell . | |
| 3,929,369 | 12/1975 | Blair . | |
| 3,934,923 | 1/1976 | Lissaman et al. | 296/180.2 |
| 3,999,796 | 12/1976 | Greene, Sr. et al. . | |
| 4,035,013 | 7/1977 | Abbott, III . | |
| 4,056,279 | 11/1977 | Dorsch | 296/180.3 |
| 4,208,197 | 6/1980 | Yakimowich et al. . | |
| 4,357,045 | 11/1982 | Kinford, Jr. . | |
| 4,375,898 | 3/1983 | Stephens | 296/180.3 |
| 4,607,874 | 8/1986 | Pears | 296/180.3 |
| 4,693,506 | 9/1987 | Massengill . | |
| 4,703,970 | 11/1987 | Gorka . | |
| 4,840,422 | 6/1989 | Engel | 296/180.4 |
| 4,926,921 | 5/1990 | Heinemann et al. . | |
| 4,957,325 | 9/1990 | Engel | 296/180.2 |

FOREIGN PATENT DOCUMENTS

| | | | |
|---|---|---|---|
| 3628412 | 2/1988 | Germany | 296/180.3 |
| 2204007 | 11/1988 | United Kingdom | 296/180.3 |

*Primary Examiner*—Dennis H. Pedder
*Attorney, Agent, or Firm*—Harness, Dickey & Pierce

[57] ABSTRACT

An air movement profiler (10) which is capable of adjusting the shape and size of the deflecting surface is disclosed. The air movement profiler (10) comprises a plurality of triangular tubes (24) mounted on the towing vehicle (12). The tubes (24) are capable of angular adjustment with respect to the vehicle (12). In addition, the length of at least one tube (24) is independently adjustable. The air movement profiler (10) can be permanently mounted or portable. The apparatus can also be folded to allow for low clearance situations.

11 Claims, 8 Drawing Sheets

AIR MOVEMENT PROFILER

BACKGROUND OF THE INVENTION

The present invention relates to air movement profilers. More particularly, the present invention relates to air movement profilers for use with automotive type of vehicles equipped or not equipped for towing trailers.

Air deflectors for cars and trucks which redirect the air over and around towed trailers are generally known in the art. These air deflectors can be divided into three categories: First, air deflectors permanently mounted to the towing vehicle. Second, air deflectors permanently mounted to the towed vehicle. Third, portable air deflectors capable of being moved from one vehicle or trailer to another.

The permanently mounted deflectors are generally large bulky components manufactured from some type of plastic material. They are designed to be permanently mounted to the cab or tractor and are sometimes designed for specific types of trailers. Some of these units may be provided with an adjustment to vary the angle of the deflector relative to the oncoming wind. This adjustment feature attempts to accommodate for various sizes of trailers. These units are normally only provided to the trucking industry for fitting on the semi-truck and trailer vehicles.

In recent years there has been a growing popularity in camping trailers, mobile home trailers and similar types of recreational vehicles. With increasing energy costs and the interests in conservation of energy, the need for all of the above types of deflectors became apparent.

The second category of air deflectors is those that are mounted to the towed trailer. These units are normally not adjustable. They are usually permanently mounted or can form an integral part of the trailer. They are designed to divert the air flow around the trailer but do not take into consideration the vehicle which is towing the trailer. Because of this, their effectiveness as a whole is limited when they are combined with a variety of towing vehicles.

The third category of air deflectors, the portable design, have enjoyed a limited amount of success in the car, light duty and medium duty trucks. These units are designed to be able to adapt to a wide variety of roof styles. Some designs also can adjust the angle of the deflecting surface to accommodate various types of towed trailers. Other designs allow for the extension of the deflecting surface which, when used in conjunction with the adjustable angularity of the deflectors, increase the effectiveness of the deflectors for a larger variety of trailers.

While all of the above three categories of deflectors have enjoyed a certain amount of success, none of them are designed to keep the air moving, relative to the vehicle and surrounding air, in the direction the air is already moving due to energy input to the air by some other portion of the vehicle. In addition, none of them are capable of having the shape of the deflecting surface adjustable to better accommodate the variety of shapes and sizes of trailers now available as well as the times when the car or truck will be operating without towing a trailer.

Accordingly, what is needed is an air movement profiler which does not actually deflect or change the direction of the air but which merely keeps the air moving, relative to the vehicle and surrounding air, in the direction that the air was already moving. This would allow the recovery of the energy which was already put into the air by the vehicle by directing this already displaced and accelerated air to a relative vehicle position where the displaced air can better effect other air to raise the air pressure behind portions of the vehicle or trailer. In this way, energy which has already been input to the air is recovered by the vehicle and the vehicle will operate at a greater efficiency.

SUMMARY OF THE INVENTION

The present invention provides the art with a light weight air movement profiler which directs rather than deflects the air, which has been displaced and accelerated by the movement of the vehicle, to a relative vehicle position where the displaced air can better effect other air. This will allow the displaced air to raise the air pressure behind portions of the vehicle or towed vehicle thus recovering some of the energy that has been inputted to it by the vehicle motion. This allows the vehicle to operate at a greater efficiency.

The air movement profiler can be a fixed design or it can be a design which is capable of adjusting the shape and size of the deflecting surface. The air movement profiler can be either permanently mounted to a vehicle or it may be portable.

The air movement profiler can provide two fundamental operations. First, the profiler can keep the air going in the direction that it is forced to take because of contact with another portion of the vehicle. Some of this deflected air that is deflected by the vehicle and kept moving in its deflected direction by the profiler can then be used to reduce the inefficiency of the vehicle and/or the trailers pulled by the vehicle. Second, since the profiler can alter the direction the air would normally have taken without the presence of the air movement profiler, this redirected air can then aid in the distribution of the air mass that was accelerated by the vehicle in such a way that it provides an additional return to the vehicle and/or trailers pulled by the vehicle thus increasing the efficiency of the vehicle.

The present invention comprises a plurality of generally triangular shaped posts, mounted close enough to each other for a pressure to build between them along their length to reduce the amount of air which would otherwise leak in between them. These triangular posts can be variable in both length and angle, thus providing for a wide variety of adjustability to adapt to any size or design of trailer being towed. Means for lowering these posts is provided to allow the vehicle passage under low clearance. Some air is allowed to "leak" between these posts to increase the air pressure behind the posts to counteract the pressure build-up between the posts. Since there is very little air that is contributing to a pressure build-up between the posts, this air is must be allowed to "leak" between the posts and increase the air pressure behind the posts.

DESCRIPTION OF THE DRAWINGS

Further objects, features and advantages of the present invention will become apparent from the analysis of the following written specification, the accompanying drawings and the appended claims in which:

DETAILED DESCRIPTION OF THE INVENTION

Figure 1:
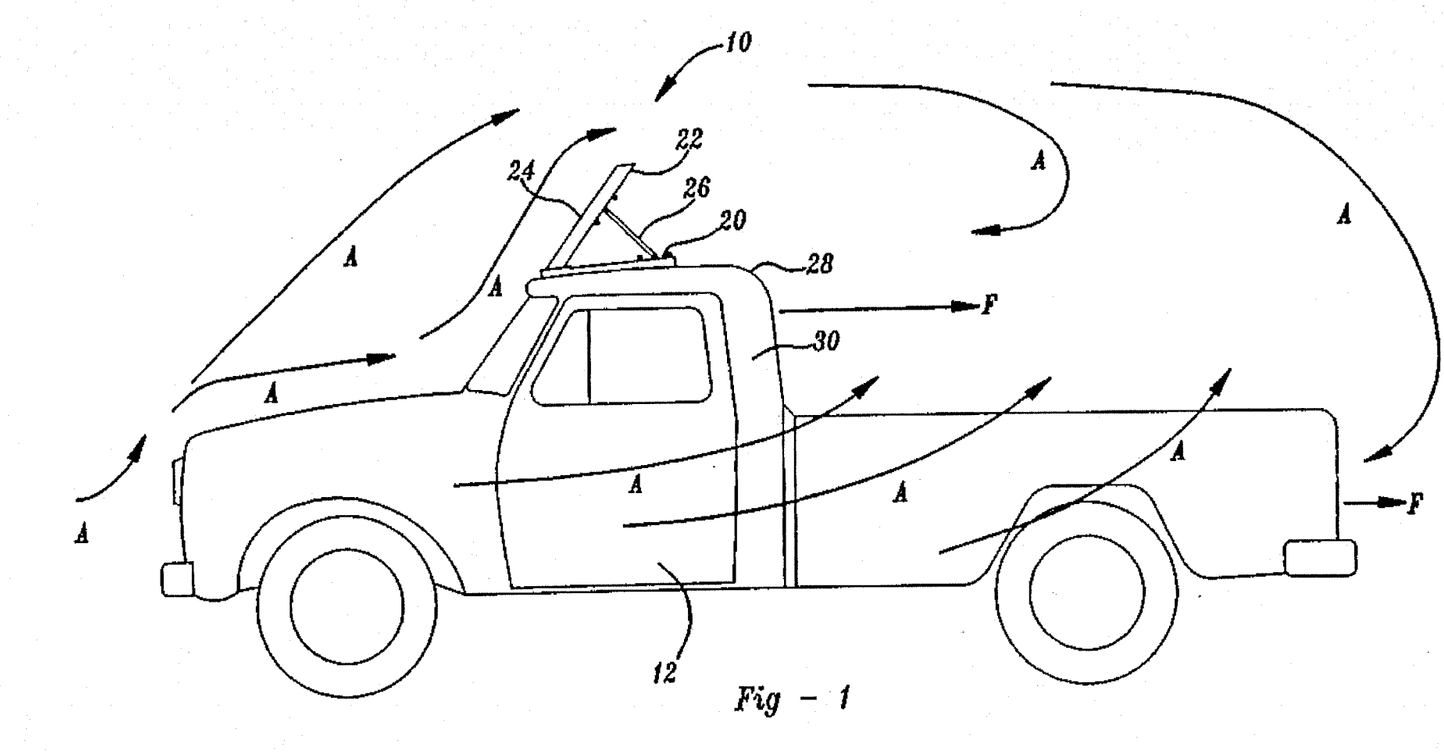
FIG. 1 is a side elevation view of a pickup truck equipped with an air movement profiler in accordance with the present invention.
Figure 2:
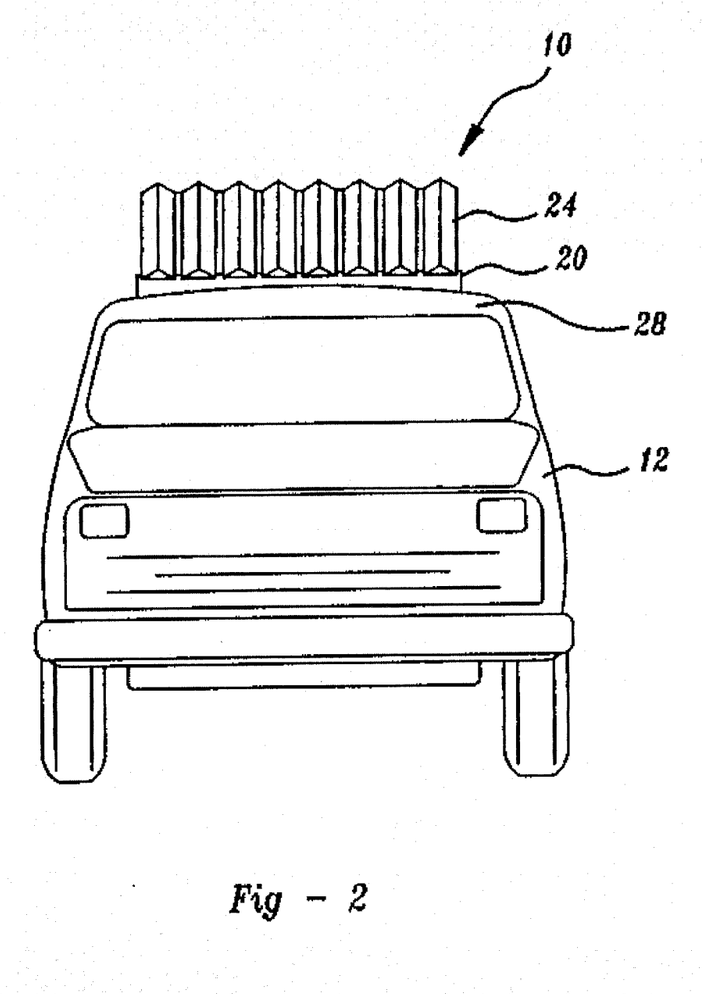
FIG. 2 is a front elevation view of a pickup truck equipped with an air movement profiler in accordance with the present invention.
Figure 3:
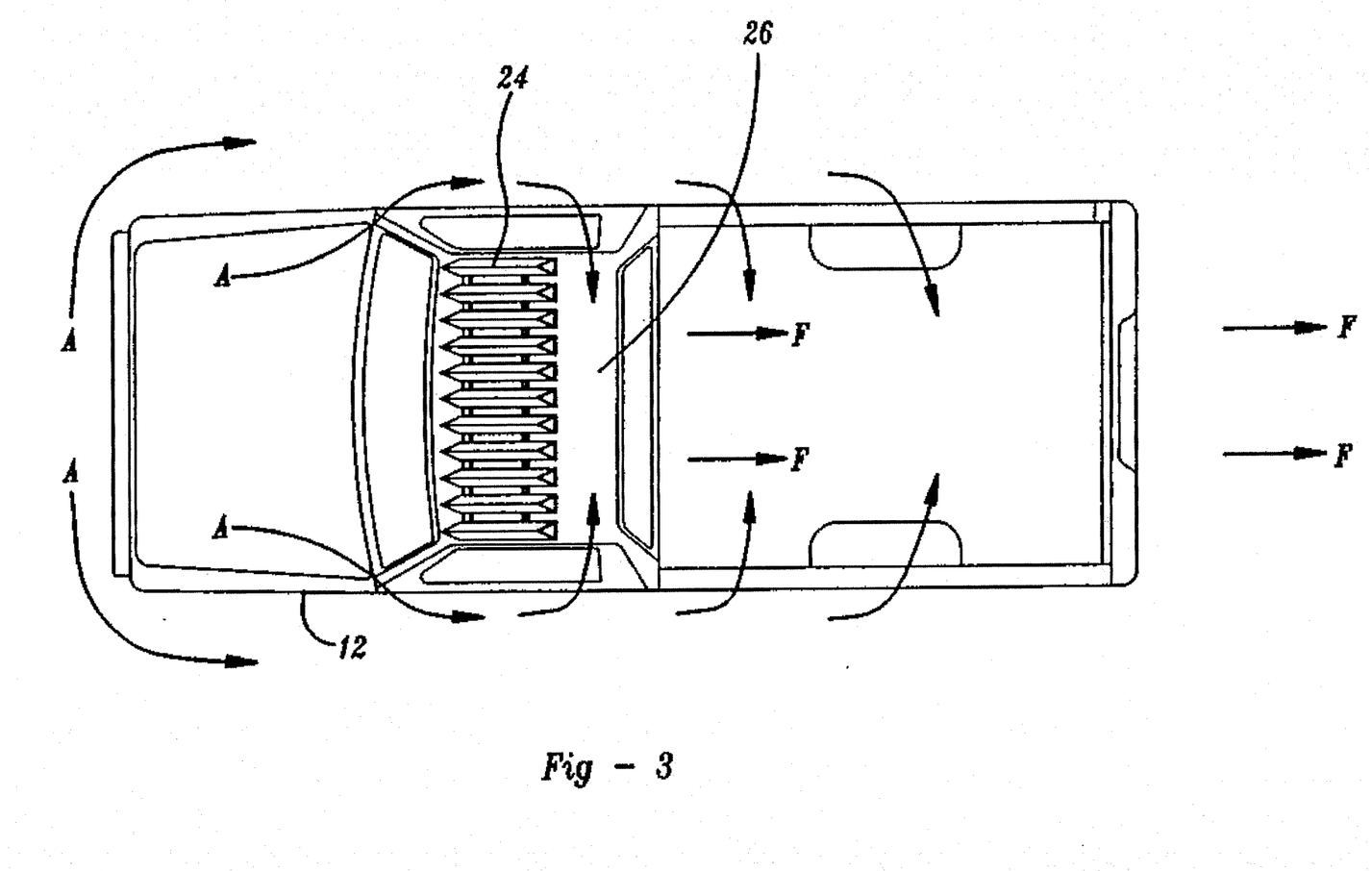
FIG. 3 is a top view of a pickup truck equipped with an air movement profiler in accordance with the present invention.

FIGS. 1 through 3 show an air movement profiler designated by reference numeral 10 mounted to a typical pickup truck 12. While the detailed description will describe the air movement profiler as being mounted to a pickup truck, it is to be understood that it is possible to mount the profiler on virtually any type of vehicle including, but not limited to, cars, station wagons, vans, medium flat bed trucks, medium box trucks, semis or any other type of vehicle.

The air movement profiler 10 shown in FIGS. 1-3 comprises a mounting frame 20, a profiler frame 22, a plurality of hollow generally triangular tubes 24, and a plurality of struts 26. The mounting frame 20 is a generally rectangular shaped frame. The frame 20 is mounted to the roof 28 of the cab section 30 of the pickup truck 12. The mounting of the frame can either be permanent or temporary. A permanent type of attachment would be welding, bolting, or other attachment means well known in the art. If portability is required, the frame 20 may be temporarily mounted to the roof 28 of the cab section 30 by methods well known in the art for mounting roof carriers to vehicles.

The profiler frame 22 is mounted to the frame 20 by hinge 50. Hinge 50 connects the profiler frame 22 to the frame 20 such that the profiler frame 22 is free to pivot about hinge 50 from a generally horizontal position to a generally vertical position.

Figure 5:
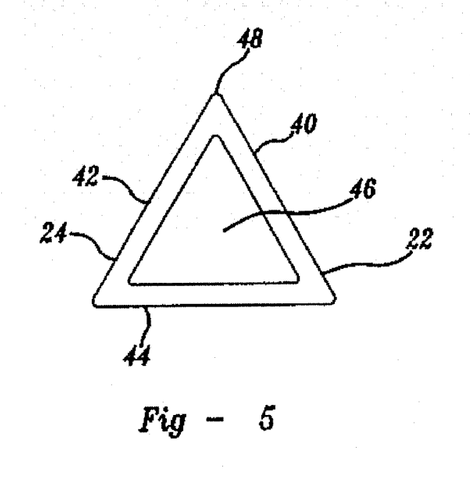
FIG. 5 is an end view in the direction of the arrows 5—5 in FIG. 4 of one of the plurality of triangular shaped posts.
Figure 12:
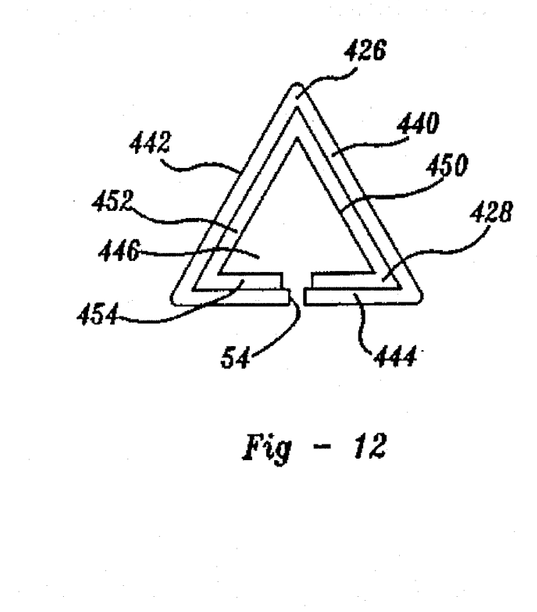
FIG. 12 is an end view in the direction of the arrows 10—10 in FIG. 9.

Each of the triangular tubes 24 has three sides 40, 42 and 44 as shown in FIG. 5. The three sides 40, 42 and 44 form a hollow triangular passage 46 extending completely through the triangular tube 24. Strut side 44 can be a continuous sheet or it can have an open seam 54 as shown in FIG. 12. Sides 40 and 42 are joined at apex 48. Apex 48 forms the leading edge of the triangular tube. Each of the sides 44 of the triangular tubes is fixedly mounted to profiler frame 22. The triangular tubes 24 are free to pivot with profiler frame 22 about hinge 50 from a generally horizontal position to a generally vertical position. The mounting of side 44 to profiler frame 22 aligns apex 48 with the front of the vehicle. The triangular tubes are mounted such that when oncoming air is encountered, they are close enough to each other for a pressure to build between them, along their length, to reduce the amount of air which would otherwise leak between them. The passage 46 allows air to flow through the triangular tubes 24 thus improving the air flow characteristics of the profiler in both a horizontal and an upright position.

Figure 6:
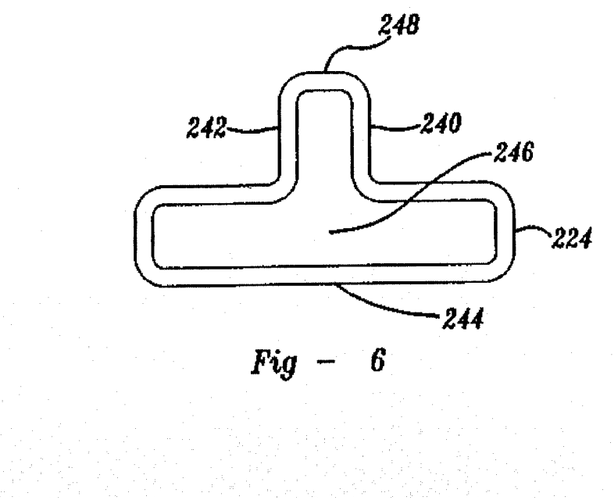
FIG. 6 is an end view similar to that of FIG. 5 but showing an alternate cross section.

Another embodiment of the present invention utilizes T-shaped tubes 224 which are generally T-shaped as shown in FIG. 6. The three sides 240, 242 and 244 form a hollow T-shaped passage 246 extending completely through the T-shaped tube 222. Sides 240 and 242 are joined at apex 248. Apex 248 forms the leading edge of the T-shaped tube. Each of the sides 244 of the T-shaped tubes is fixedly mounted to profiler frame 22 similar to triangular tubes 24 described above. The T-shaped tubes 224 are free to pivot with profiler frame 22 about hinge 50 from a generally horizontal position to a generally vertical position. The mounting of side 244 to profiler frame 22 aligns apex 248 with the front of the vehicle. The T-shaped tubes are mounted such that when oncoming air is encountered, they are close enough to each other for a pressure to build between them, along their length, to reduce the amount of air which would otherwise leak between them. The passage 246 allows air to flow through the T-shaped tubes thus improving the air flow characteristics of the profiler in both a horizontal and an upright position.

While the detailed description will describe the air movement profiler using the generally triangular shaped tubes 24, it is to be understood that it is possible to substitute another shape as shown with the generally T-shaped tube 224 for the triangular shaped tube 24 throughout the description.

Figure 4:
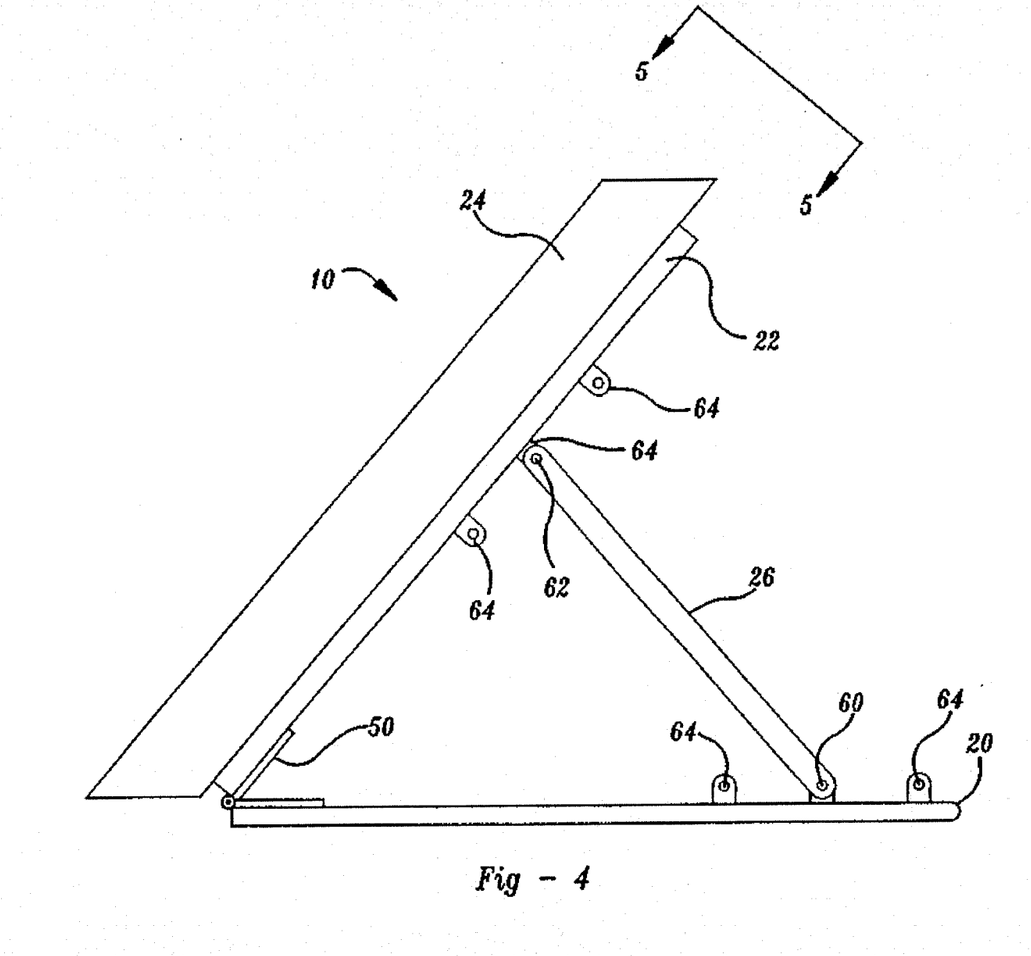
FIG. 4 is a side elevation view of the air movement profiler in accordance with the present invention.

Struts 26 are each rotatably connected on one end to the rear of frame 20 by pin 60. The opposite end of each strut is secured to profiler frame 22 by pin 62. Profiler frame 22 and/or frame 20 can be provided with a plurality of attachment points 64 for struts 26 as shown in FIG. 4. By providing a variety of attaching points 64, the angle of the profiler frame 22 and thus the triangular tubes 24 can be varied angularly relative to the frame.

Upon operation of the vehicle, the profiler frame 22 is set to an angle which provides the most effective profiling surface. The profiler frame 22 would normally only be mounted horizontally when it would be necessary to enter a low clearance garage or other structure. When the profiler (10) is mounted horizontally, a latch (not shown), of any type well known in the art, is provided to secure the profiler (10) in the horizontal position.

Figure 7:
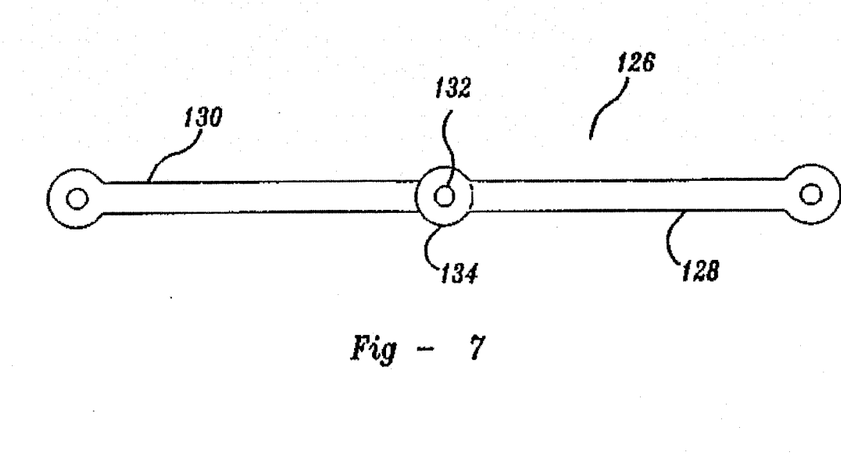
FIG. 7 is a longitudinal view of a foldable strut in accordance with another embodiment of the present invention.
Figure 8:
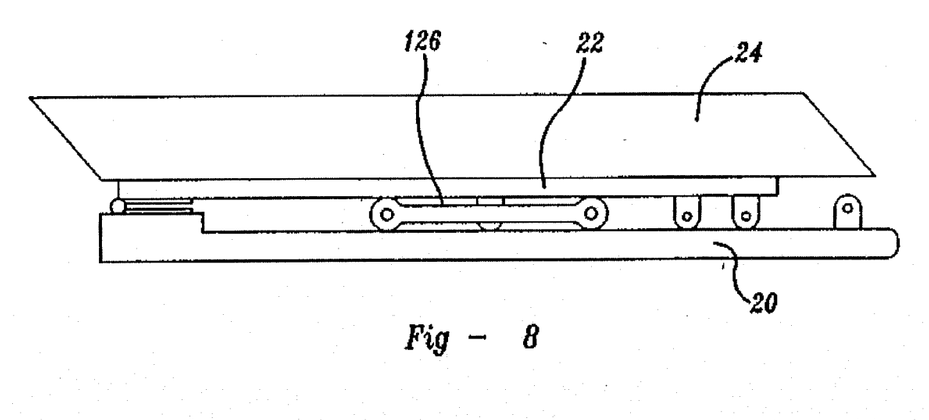
FIG. 8 is a side elevation view of the air movement profiler in its folded position.

Another embodiment of the present invention uses a strut assembly 126 as shown in FIG. 7. In order to allow for the compact storage of the movement profiler 10 it may be desirable to be able to fold the support strut. Strut assembly 126 shown in FIG. 7 comprises lower strut 128, upper strut 130 and hinge pin 132. One end of lower strut 128 is connected to one end of upper strut 130 by hinge pin 132 to form hinge section 134. Hinge section 134 allows the upper strut 130 to fold over and back along the side of the lower strut 128 thus shortening the length of the strut assembly 126 to a length which is significantly shorter thus allowing compact storage of the air movement profiler as shown in FIG. 8. When the strut assembly is unfolded, locking means maintains the strut in an extended position as shown in FIG. 7.

Figure 9:
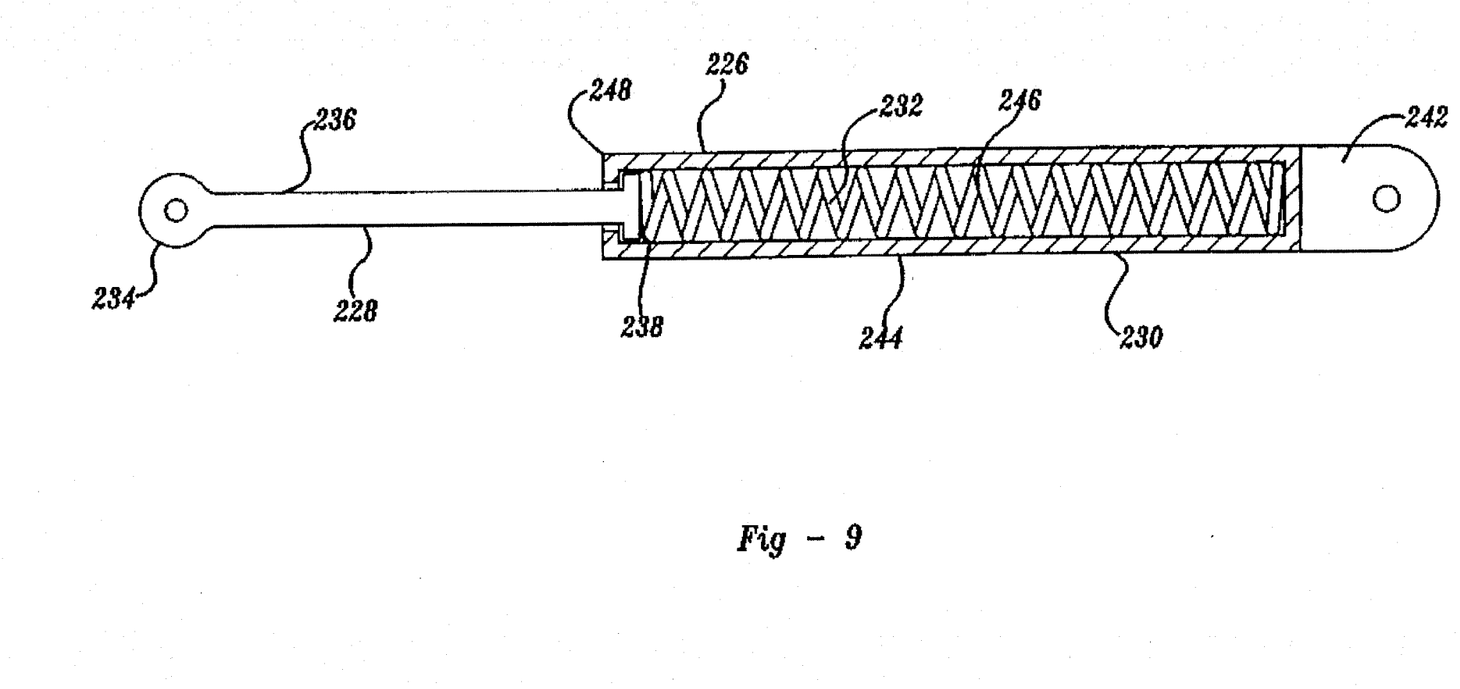
FIG. 9 is a longitudinal view, partially in cross section of a spring loaded strut in accordance with another embodiment of the present invention.

Another embodiment of the present invention uses a strut assembly 226 as shown in FIG. 9. Strut assembly 226 comprises a lower strut 228, an upper strut 230 and a coil spring 232. The lower strut 228 can be a solid bar or a tubular section and has an attachment boss 234, a longitudinal section 236 and a spring seat 238. The upper strut 230 has an attachment boss 242, a tubular section 244 forming a cylindrical cavity 246 and an extension stop 248. The coil spring 232 is disposed within the cylindrical cavity 246 of the upper strut 230. The spring seat 238 of the lower strut is also disposed within the cylindrical cavity 246 such that coil spring 232 is slightly compressed. Extension stop 248 is then positioned at the end of upper strut 230 trapping the lower strut 228 inside the cavity 246 of the upper strut 230. The length and strength of the coil spring 232 is determined by the type of vehicle towing the trailer as well as the type of trailer being towed. A different spring could be required to "tune" the air movement profiler to each specific vehicle configuration.

The strut assemblies 226 position profiler frame 22 in an upright position. The angle of the profiler frame 22 is determined by the attachment positions on the profiler frame 22 and frame 20 of the strut assembly 226. The initial length of strut assembly 226 is defined by the coil spring, 232 at full extension, biasing spring seat 238 against the extrusion stop 248. As the vehicle moves, the reaction to the force of the wind against the triangular tubes 24 causes compressive force on strut assembly 226. As the force of the wind increases due to increased vehicle speed or wind gusting, the coil spring 232 compresses, shortening the length of strut assembly 226 and lowering the angle of the profiler frame 22 and triangular tubes 24. This ability to react to variable wind velocities provides the capability of dynamically changing the profiling surface to provide a more effective air movement profiler. As a matter of general situation, the air profiler does not itself actually change the direction of the majority of air. The air is merely kept moving relative to the vehicle, and other air, in the direction that the air is already moving. For this reason, the air profiler may be constructed of much lighter materials than would be required if the air profiler actually caused much change in the direction of the air flow. The springed strut assembly 224 accommodates the situation that might occasionally occur where the air profiler would be required to change the direction of a large mass of air.

The lower strut 228 could also be provided with a hinge section (not shown) similar to the hinge section 134 of strut 126 as shown in FIG. 8. This would allow for easier storage of the strut assembly 226 when the air movement profiler is folded.

Figure 10:
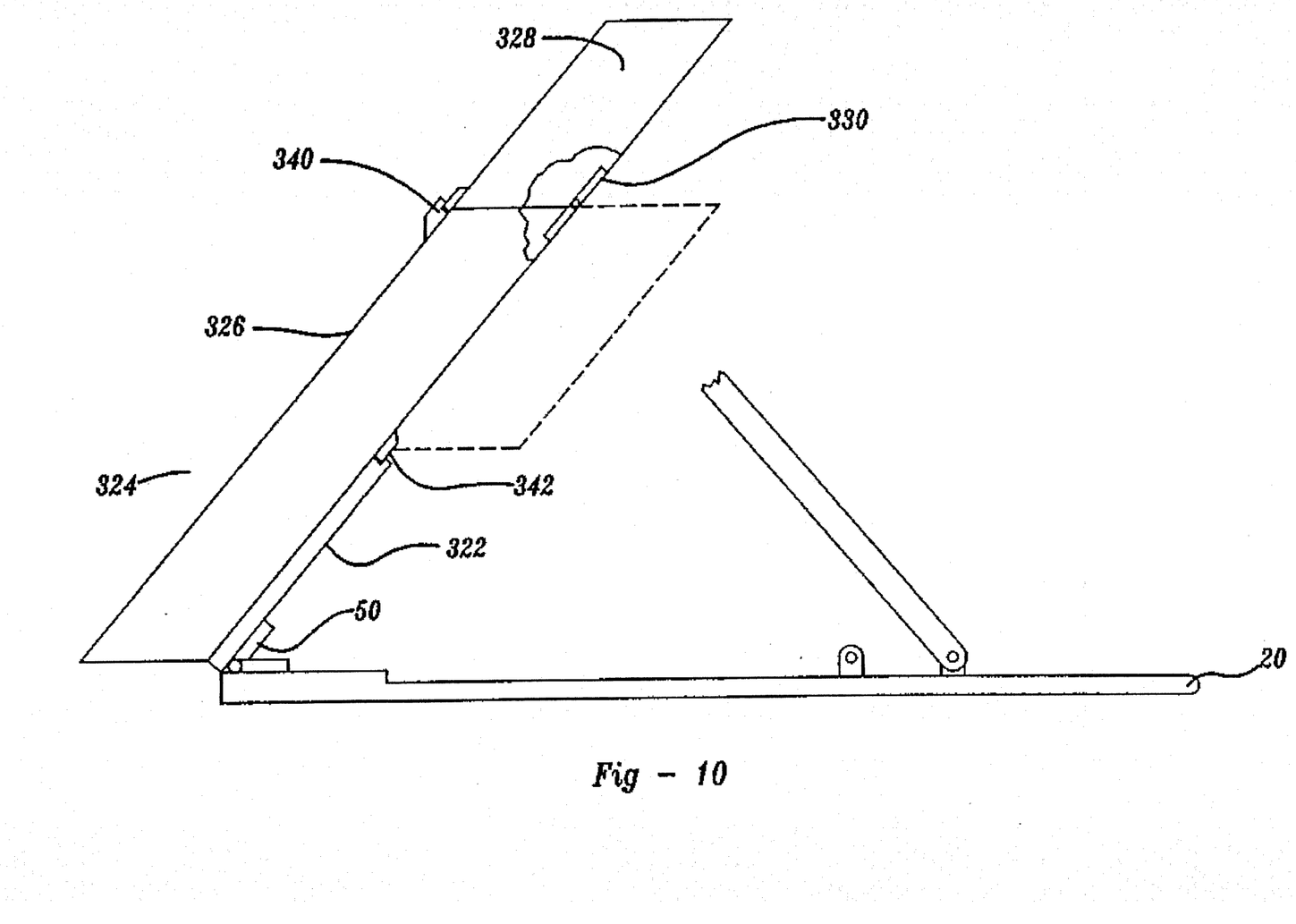
FIG. 10 is a side elevation view similar to that of FIG. 4 but showing an adjustable length triangular post.

Another embodiment of the present invention uses a variable length triangular tube assembly 324 as shown in FIG. 10. Triangular tubular assembly 324 comprises lower tubular section 326, upper tubular section 328 and hinge 330. The lower tubular section 326 is fixedly attached to a profiler frame 322. The upper tubular section 328 is hinged to the lower tubular section 326 by hinge 330 as shown in FIG. 10.

For this embodiment, the profiler frame 322 is hinged to frame 20 similar to profiler frame 22 but the upper portion of profiler frame 322 is located near the top of the lower tubular section 326. The profiler frame 322 is recessed into the lower tubular section 326 as shown in FIG. 10 to provide for a flat surface 344 on tubular assembly 324. When the triangular tube assembly 324 is in its extended position as shown in FIG. 10, the upper tubular section 328 is latched to the lower tubular section 326 to maintain its upright position by latch 340. Latch 340 is any type of latch which is well known in the art. When the triangular tube assembly 324 is in its folded position as shown in phantom in FIG. 10, the upper tubular section 328 is again latched to the lower tubular section 326 to maintain its folded position by latch 342. Latch 342 is any type of latch which is well known in the art.

Figure 11:
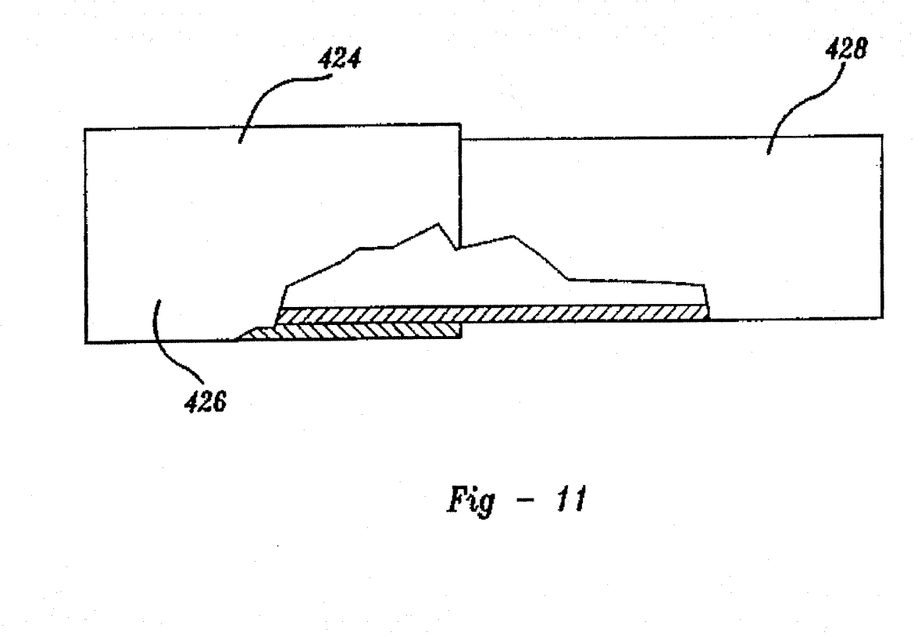
FIG. 11 is a side elevation of an adjustable length telescoping triangular post.

Another embodiment of the present invention uses a variable length triangular tube assembly 424 as shown in FIGS. 11 and 12. Triangular tubular assembly 424 comprises outer tubular section 426 and inner tubular section 428. The outer tubular section 426 is fixedly attached to profiler frame 422. The inner tubular section 428 is nested within the outer tubular section 426 as shown in FIG. 12.

The outer tubular section 426 has three sides 440, 442 and 444 as shown in FIG. 12. The three sides 440, 442 and 444 form a hollow triangular passage 446 extending completely through the triangular tube assembly 424. Each of the sides 444 of the triangular tubes is fixedly mounted to the profiler frame 422.

The inner tubular section 428 has three sides 450, 452 and 454. The inner tubular section 428 is disposed within the outer tubular section 426 such that inner tubular section sides 450 and 452 are sprung outwards to bear against the outer tubular side sections 440 and 442 as shown in FIG. 12. This springing action of the inner tubular section 428 holds the inner tubular section 428 in any position relative to the outer tubular section 426 thus allowing for an infinite variability of lengths of the tubular assembly 424 between the length of section 426 alone and of the two sections 426 and 428 combined. If necessary, a latching means (not shown) of designs well known in the art may be employed to fixedly position sections 426 and 428 with respect to each other. With this type of construction, it is possible to "tailor" the air movement profiler to many conditions and/or vehicles.

Another embodiment of the present invention replaces the profiler frame 22 by a plurality of struts 26 equal in number to the plurality of triangular tubes 24 and attaching each triangular tube 24 to frame 20 by a hinge (not shown). This allows each of the plurality of triangular tubes to be variable in angle independently of other tubes.

Any number of or all of the plurality of triangular tubes 24 which are part of the air movement profiler 10 can be replaced by a variable length triangular tube assembly 324 or 424. The variability in length of the triangular tube assembly provides another method by which the air profile surface can be adapted to better perform when used on different vehicle configurations. When combined with a variety of attaching points, independently supported triangular tubes and/or variable length struts, the widest variety of vehicle configurations can be accommodated including the times when the towing vehicle is operated without a trailer.

Referring now to FIGS. 1 and 3, it can be seen that by utilizing the above type of air movement profiler, a light weight air profiler is possible that does not actually change the direction of the air to any great extent because the air profiler is mounted just to the rear of the air stream already directed by the front of the vehicle as shown by arrows A in FIGS. 1 and 3. The air which has had energy input to it by the vehicle power source to initially change the air's direction is kept going in that same direction with very little additional input of energy from the vehicle power source.

Rather than deflected, the air is merely directed to an area of the vehicle which, without the help of the air movement profiler, would have a partial vacuum formed. The air movement profiler directs air into these partial vacuum areas as shown by arrows A in FIG. 3, so as to increase the air pressure and reduce the amount of drag experienced by the vehicle due to these low pressure areas. Thus, the forces designated by arrow F in FIG. 1 and 3 are reduced by the recovery of a portion of the energy initially input to the air by the front of the vehicle.

The spaces between the upright posts 24 allow a small amount of air to pass through the air movement profiler into the area immediately behind the air movement profiler and thus reduce the amount of partial vacuum in this area also. While this could be accomplished using a larger and heavier air deflector to force the air to change direction, the air movement profiler accomplishes this by using a much lighter assembly which merely helps the air to travel in its original direction.

As shown in FIG. 3, the movement of the air, arrows A, creates a shielding affect which works in conjunction with the profiled air coming from the air movement profiler to shield the structure of the air movement profiler from off-vehicle direction air produced forces or cross winds. Thus there is no need for the profiler to have air deflection strength in the direction generally perpendicular to the vehicle.

The air movement profiler is thus structured for each vehicle situation to accommodate the air that was accelerated by the vehicle. This energized air is directed to areas of the vehicle where it is possible to then recover a portion of the energy expended by the vehicle. This recovery of energy increases the overall efficiency of the vehicle.

While the above detailed description describes the preferred embodiments of the present invention, it should be understood that the present invention is susceptible to modification, variation and alteration without deviating from the scope and fair meaning of the subjoined claims.

What is claimed is:

1. An air movement profiler for a vehicle comprising:

a first frame;

means for attaching said first frame to said vehicle;

a second frame hinged to said first frame and movable from a first position which is generally horizontal, to a second position which is generally vertical;

a plurality of posts fixedly attached to said second frame in an aligned position, at least one of said plurality of posts having an adjustable length;

supporting means for positioning said second frame at a third position, said third position being between said first and second positions.

2. The air movement profiler of claim 1 wherein an air pressure differential is present on each side of said means for directing an air stream and said air movement profiler further comprises means for reducing said air pressure differential.

3. The air movement profiler of claim 1 wherein said supporting means is a plurality of struts, each strut of said plurality of struts having a first end and a second end, said first end attached to said second frame, said second end pivotably attached to said first frame.

4. The air movement profiler of claim 1 wherein said supporting means is a plurality of struts, at least one strut of said plurality of struts comprising;

an upper strut member having a first end and a second end, said first end attached to said second frame;

a lower strut member having a first end and a second end, said first end pivotably attached to said second end of said upper strut member, said second end pivotably attached to said first frame;

said lower strut member cooperating with said upper strut member to position said second frame to said third position.

5. The air movement profiler of claim 1 wherein said supporting means is a plurality of struts, at least one strut of said plurality of struts comprising;

an upper strut member demountably attached to said second frame.

a lower strut member pivotably attached to said first frame; said lower strut member cooperating with said upper strut member to position said second frame at said third position;

biasing means for biasing said upper strut member away from said lower strut member.

6. The air movement profiler of claim 5 wherein said air deflector apparatus further comprises;

said upper strut member having a first end and a second end, said upper strut member defining a cylindrical chamber open at said second end and longitudinally extending from said second end towards said first end, said first end of said upper strut member demountably attached to said second frame;

said lower strut member having a first end and a second end, said lower strut member disposed within said cylindrical chamber, said second end of said lower strut member pivotably attached to said second frame;

retaining means for keeping said lower strut member disposed within said cylindrical chamber of said upper strut member;

said biasing means comprising a coil spring disposed within said cylindrical chamber, said coil spring located between said upper strut member and said first end of said lower strut member such that said lower strut member is biased away from said upper strut member against said retaining means.

7. The air movement profiler of claim 1 wherein said at least one of said plurality of posts having an adjustable length comprises;

a lower post member fixedly attached to said second frame;

an upper post member having a first end and a second end, said first end of said upper post member hinged to one end of said lower post member such that said upper post member moves from a non-use position to an in-use position, said in-use position extending the length of said lower post member.

8. The air movement profiler of claim 7 further comprising first retention means for retaining said upper post member in said in-use position.

9. The air movement profiler of claim 7 further comprising second retention means for retaining said upper post member in said non-use position.

10. The air movement profiler of claim 1 wherein said at least one post of said plurality of posts having an adjustable length is a telescopic two-piece hollow triangular construction.

11. The air movement profiler of claim 1 wherein said at least one post of said plurality of posts is of hollow T-shaped construction.

* * * * *